US008121840B2

(12) United States Patent
Chu et al.

(10) Patent No.: US 8,121,840 B2
(45) Date of Patent: *Feb. 21, 2012

(54) SYSTEM AND METHOD FOR LIKELIHOOD COMPUTATION IN MULTI-STREAM HMM BASED SPEECH RECOGNITION

(75) Inventors: Stephen Mingyu Chu, Beavercreek, OH (US); Vaibhava Goel, Elmsford, NY (US); Etienne Marcheret, White Plains, NY (US); Gerasimos Potamianos, White Plains, NY (US)

(73) Assignee: Nuance Communications, Inc., Burlington, MA (US)

( * ) Notice: Subject to any disclaimer, the term of this patent is extended or adjusted under 35 U.S.C. 154(b) by 933 days.

This patent is subject to a terminal disclaimer.

(21) Appl. No.: 12/131,190

(22) Filed: Jun. 2, 2008

(65) Prior Publication Data
US 2008/0235015 A1 Sep. 25, 2008

Related U.S. Application Data

(63) Continuation of application No. 10/946,381, filed on Sep. 21, 2004, now Pat. No. 7,480,617.

(51) Int. Cl.
*G10L 15/14* (2006.01)
(52) U.S. Cl. ....................................................... 704/256
(58) Field of Classification Search .................. 704/256
See application file for complete search history.

(56) References Cited

U.S. PATENT DOCUMENTS
7,480,617 B2 * 1/2009 Chu et al. ..................... 704/256

OTHER PUBLICATIONS

A. Janin el al.,"Multi-Stream Speech Recognition: Ready for Prime Time?", Int'l Camp. Scient Inst. Berkeley, CA; submitted to Eurospeech '99 Budapest, 4 pages.
H. Bourland et al., "A New ASR Approach Based on Independent Processing and Recombination of Partial Frequency Bands", Intl. Comp. Sicent Inst. Berkeley, CA; 4 pages, Oct. 1996.
S. Young et al., "the HTK Book" 8 pages title and contents; Chapter 5—"Speech Input/Output", Version 2.2, Jan. 1999; pp. 67-79.
S. Dupont, "Audio-Visual Speech Modeling for Continuous Speech Resognition", IEEE Transactions on Multimedia, vol. 2, No. 3, Sep. 2000 pp. 141-151.
G. Potamianos et al., "Recent Advances in the Automatic Recognition of Audio-Visual Speech", Proceeding of the IEEE, vol. 91, No. 9, Sep. 2003; pp. 1-18.
J.H. Connell, et al., "A Real-Time Prototype for Small-Vocabulary Audio-Visual ASR", Int'l Conference on Multimedia and Expo (ICMB)., vol. II, pp. 469-472, Baltimore, Maryland, Jul. 2003.

(Continued)

*Primary Examiner* — Susan McFadden
(74) *Attorney, Agent, or Firm* — Wolf, Greenfield & Sacks, P.C.

(57) ABSTRACT

A system and method for speech recognition includes determining active Gaussians related to a first feature stream and a second feature stream by labeling at least one of the first and second streams, and determining active Gaussians co-occurring in the first stream and the second stream based upon joint probability. A number of Gaussians computed is reduced based upon Gaussians already computed for the first stream and a number of Gaussians co-occurring in the second stream. Speech is decoded based on the Gaussians computed for the first and second streams.

22 Claims, 6 Drawing Sheets

OTHER PUBLICATIONS

M. Novak et al., "Efficient Hierarchical Labeler Algorithm for Gaussian Likelihoods Computation in Resource Constrained Speech Resognition Systems", IBM T.J. Watson Research Center, Yorktown Heights, NY 10598, ISASS 2002, 4 pages.

A. W. Senior, "Face and Feature Finding for a Face Resognition System", Second Int'l Conf on Audio and Video based Biometric Person Authentication, pp. 154-159, Washington, DC, Mar. 1999.

* cited by examiner

Tree Building (Training)

Cluster Gaussians in a search tree to build models for decoding - 10

Survey Gaussians in multiple resolutions for each feature vector

12

Evaluate Gaussian densities (e.g., for states or sets of observations)

14

Runtime

During decoding, for each feature frame, traverse the search tree to identify active Gaussians

16

Assign default likelihoods if no active Gaussians are found

SYSTEM AND METHOD FOR LIKELIHOOD COMPUTATION IN MULTI-STREAM HMM BASED SPEECH RECOGNITION

RELATED APPLICATION INFORMATION

This application is a Continuation application of U.S. patent application Ser. No. 10/946,381 filed Sep. 21, 2004, now U.S. Pat. No. 7,480,617 incorporated herein by reference in its entirety.

BACKGROUND

1. Technical Field

Exemplary embodiments of the present invention relate to speech recognition, and more particularly to a system and method, which reduces a number of Gaussian calculations needed to increase computational efficiency in multi-stream speech recognition tasks.

2. Description of the Related Art

Recently, there has been significant interest in the use of multi-stream hidden Markov models (HMMs) for automatic speech recognition (ASR). For example, such models have been successfully considered for multi-band ASR, separate static and dynamic acoustic feature modeling, as well as for audiovisual ASR.

In its application in audio-visual speech recognition, the multi-stream approach gives rise to an effective paradigm to fuse and model two separate information sources carried in the audio and visual observations. Specifically, it has been demonstrated that multi-stream decision fusion attains significant improvement in recognition accuracy over the state-of-the-art single-stream based fusion methods, e.g., hierarchical linear discriminant analysis (HiLDA).

However, the gain in recognition performance is achieved at the cost of higher computational complexity due to the separate statistical modeling of the two observation streams. For instance, in the audio-visual ASR system described in Potamianos et al., "Recent advances in the automatic recognition of audio-visual speech:" $Proc.\ IEEE$, 91(9): 1306-1326, 2003., the signal processing front end produces audio and visual observation vectors with 60 and 41 dimensions, respectively. In HiLDA fusion, the joint audio-visual observations of 101 dimensions are projected to a 60 dimensional audio-visual feature space, which can be modeled by single-stream HMMs with a similar number of Gaussian densities as the audio only system.

On the other hand, the multi-stream HMMs model each of the two modalities in its original feature space. Hence, the number of Gaussian components required is roughly doubled in order to preserve the same modeling resolution in the output densities. For a typical decoding algorithm, the time complexity is roughly linear with respect to the total number of Gaussians in the system. Therefore, without special treatment, an audio-visual system based on two-stream HMMs will approximately command twice the computational load as a comparable single-stream system in the recognition stage.

Effectively managing the computational load is needed for the development of real-time audio-visual ASR systems. Because visual processing is expected to take a sizeable portion of the available computing power, it becomes even more imperative to improve the efficiency of algorithms involved in the decoding process, which include likelihood computation and search.

Algorithms exist for fast evaluation of Gaussians in single-stream HMMs. One class of algorithms exploits the fact that at a given frame, only a small subset of Gaussian components in the total Gaussian pool are significant to the likelihood computations, e.g., the roadmap algorithm and the hierarchical labeling algorithm. Naturally, these algorithms may be directly applied to each individual stream in the multi-stream HMM. Moreover, the synchronized and parallel nature of the observation streams in multi-stream HMMs provides a fresh dimension to formulate new approaches to further improve computational efficiency.

SUMMARY

A system and method for speech recognition includes determining active Gaussians related to a first feature stream and a second feature stream by labeling at least one of the first and second streams, and determining active Gaussians co-occurring in the first stream and the second stream based upon joint probability. A number of Gaussians computed is reduced based upon Gaussians already computed for the first stream and a number of Gaussians co-occurring in the second stream. Speech is decoded based on the Gaussians computed for the first and second streams.

A speech recognition system includes a first front end, which extracts features from a first stream to generate likelihoods of the features of the first stream. A second front end extracts features from a second stream associated with the first stream for generating likelihoods of the features of the second stream. A processing module determines active Gaussians used to compute the likelihoods of the features of the first stream and finds active Gaussians co-occurring in the second stream to generate the likelihoods of the features of the second stream such that a number of Gaussians computed for the second stream is reduced based upon Gaussians already computed for the first stream. A speech decoder decodes speech based on the Gaussians computed for the first and second streams.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 is a block/flow diagram showing hierarchical labeling of at least one stream in accordance with illustrative embodiments;

DETAILED DESCRIPTION OF PREFERRED EMBODIMENTS

Figure 2:
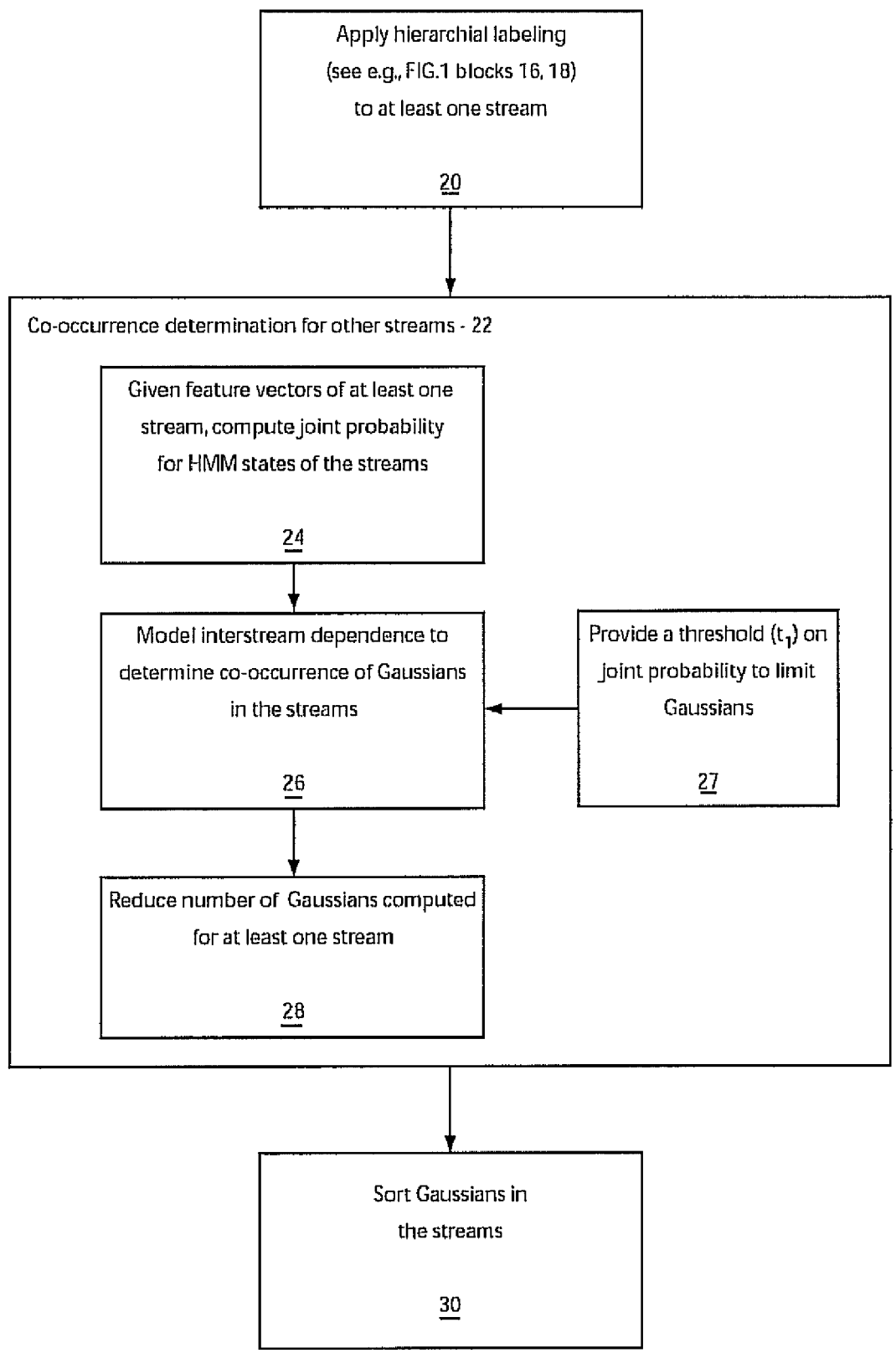
FIG. 2 is a block/flow diagram showing determination of co-occurring Gaussians in accordance with illustrative embodiments.

Exemplary embodiments of the present invention provide efficient handling and evaluation of mixtures of Gaussian densities in Hidden Markov Models (HMMs). In one embodiment, a system and method estimate a co-occurrence mapping of the Gaussian mixture components that separately model individual streams of a multi-stream system. The method essentially treats stream pairs in a master/slave fashion, with the master Gaussian components driving the slave component selection. In accordance with these exemplary embodiments, in an audio-visual digit recognition task, the system/method can achieve significant improvement in decoding efficiency with a minimal degradation in recognition performance.

Multi-stream Hidden Markov Models (HMM) may be introduced in the field of automatic speech recognition as an alternative to single-stream modeling of sequences of speech informative features. In particular, the multi-stream HMMs may be successful in audio-visual speech recognition, where features extracted from video of the speaker's lips are also available. However, in contrast to single-stream modeling, the multi-stream HMMs use during decoding becomes computationally intensive, as it needs calculating class-conditional likelihoods of the added stream observations.

In accordance with particularly useful embodiments, the calculation overhead is reduced by drastically limiting the number of observation probabilities computed for the visual stream. The method estimates a joint co-occurrence mapping of the Gaussian mixture components that separately model the audio and visual observations, and uses co-occurrence mapping to select the visual mixture components to be evaluated, given the already selected audio observations. Experiments using this scheme are reported herein on a connected-digits audio-visual database, where it demonstrates significant speed gains at decoding with only about 5% of the visual Gaussian components requiring evaluation, as compared to the independent evaluation of audio and visual likelihoods.

It should be understood that the elements shown in the FIGS. may be implemented in various forms of hardware, software or combinations thereof. Preferably, these elements are implemented in software on one or more appropriately programmed general-purpose digital computers having a processor and memory and input/output interfaces.

It is understood that the embodiments described herein include all of the hardware and software components needed to employ speech recognition on a plurality of different platforms and using a plurality of different technologies. For example, systems employing exemplary embodiments of the present invention may include an acoustic/video front end, speech recognition model storage, processors, microphones, speakers, etc. Platforms may include computers, telephones, personal digital assistants, recording devices, answering machines and the like.

Referring now to the drawings in which like numerals represent the same or similar elements and initially to FIG. 1, a system/method for hierarchical labeling is illustratively shown. It is to be understood that other labeling methods may also be employed. In an HMM, an emission density function of a state is typically parameterized by a mixture of Gaussian densities. The state conditional likelihood of a given observation vector x at time t is computed as $$p(x|s) = \sum_{g \in G(s)} p(g|s)p(x|g) \quad (1)$$

where G(s) is the set of Gaussians that make up the GMM (Gaussian Mixture Model) for state s.

As a part of the training process, the complete set of available Gaussian densities is clustered into a search tree in block 10, in which the leaves correspond to the individual Gaussians, and a parent node is the centroid of its children. Thus, levels closer to the root node can be viewed as lower resolution representations of the feature space. In the experiments described in this paper, the trees illustratively have four levels.

The hierarchical labeling algorithm takes advantage of the sparseness by surveying the Gaussian pool in multiple resolutions given a feature vector x, in block 12. In block 14, an evaluation of a Gaussian density can be carried out on-demand as a state associated with the particular Gaussian is invoked; or, alternatively, a set of Gaussians can be precomputed as soon as the observation is available without regard to their state membership. For simplicity, the former may be referred to as the lazy method, and the latter as the eager method. For a system with a large number of Gaussians, only a small subset of the complete set of Gaussian densities are significant to likelihood computation at any given time. Hence, clever exploitation of this sparseness combined with the eager method yields a very efficient algorithm to compute the conditional likelihoods during decoding.

During decoding (Runtime), for each feature frame, the tree is traversed to identify a subset of active Gaussians, Y. In block 16, based on Y, the conditional likelihood of a state is computed using the following approximation $$p(x|s) = \max_{g \in Y \cap G(s)} p(g|s)p(x|g) \quad (2)$$

If no Gaussian from a state is present in Y, a default floor likelihood is assigned to that state in block 18.

Referring to FIG. 2, Gaussian co-occurrence is shown in accordance with illustrative embodiments of the present invention. The hierarchical labeling of FIG. 1 relies on the hierarchical tree to give a list of active Gaussian densities for the current observation. A straightforward application of the algorithm to multi-stream HMMs is to consider a separate tree for each stream and determine the active Gaussians in independence from other streams. However, even with the highly efficient pruning provided by hierarchical labeling, the task of Gaussian computation still accounts for approximately 50% to 70% of the total recognition effort in our single-stream ASR system. So, the independent hierarchical labeling scheme may be unsuitable for real-time implementation of multi-stream HMMs.

The synchronous, parallel streams in a multi-stream HMM may be employed to model different aspects of the same underlying stochastic process. Therefore, some degrees of inter-stream dependencies may exist among the feature spaces. Indeed, this leads to the formulation of Gaussian co-occurrence modeling. Particularly, hierarchical labeling is preferably applied in only one of the streams in block 20, and co-occurrence statistics are used to determine the active Gaussian components for the rest of the streams in block 22.

To simplify discussion, the subsequent derivations are restricted to the two-stream case. However, note that the formulation is completely general, and the equations can be readily extended to include more than two observation streams.

Given feature vectors from two streams, $x_1$ from stream 1 and $x_2$ from stream 2, the joint probability $p(x_1, x_2 \ s)$ for HMM states is computed in block 24. Multi-stream systems may make the assumption that, conditioned on HMM state, the streams are independent. Consequently, the joint probability is factored as $$p(x_1, x_2|s) = p(x_1|s)p(x_2|s) = \begin{cases} \sum_{g_1 \in G_1(s)} p(g_1|s)p(x_1|g_1) \\ \sum_{g_2 \in G_2(s)} p(g_2|s)p(x_2|g_2) \end{cases} \times \quad (3)$$

Under hierarchical labeling (equation 2), equation 3 is approximated as $$p(x_1, x_2|s) = \begin{cases} \max_{g_1 \in Y_1 \cap G_1(s)} p(g_1|s)p(x_1|g_1) \\ \max_{g_2 \in Y_2 \cap G_2(s)} p(g_2|s)p(x_2|g_2) \end{cases}, \quad (4)$$

where $Y_1$ and $Y_2$ are the Gaussians resulting from the hierarchical labeling of stream 1 and stream 2, respectively.

In the Gaussian co-occurrence method it is attempted to model the inter-stream dependence, in block 26. This modeling is started by removing the independence assumption made in equation 3, and rewriting the state conditional likelihood as $$p(x_1, x_2|s) = \sum_{g_1, g_2 \in H} p(x_1, g_1, x_2, g_2|s) \quad (5)$$
$$= \sum_{g_1, g_2 \in H} p(x_1, g_1|s)p(x_2, g_2|x_1, g_1, s),$$

where H is the set of all Gaussians belonging to HMMs used for modeling the two streams. Note that in one embodiment, the Gaussians are not shared across states or streams, and hence, for any given state, only Gaussians belonging to that state will be effective in the summation.

Let $Q_1 \subseteq Y_1$ be a set of stream 1 Gaussians. The details of how $Q_1$ is determined are discussed below in the experimental results. Using $Q_1$, the second term in equation 5 is approximated as $$p(x_2, g_2|x_1, g_1, s) \approx p(x_2, g_2|x_1, Q_1, s) \quad (6)$$

then the Right Hand Side of equation 6 is further approximated as $$p(x_2, g_2|x_1, Q_1, s) \approx \begin{cases} p(x_2, g_2|s), & \text{if } \max_{g'_1 \in Q_1} q(g'_1, g_2|x_1) > t_1; \\ 0, & \text{otherwise.} \end{cases} \quad (7)$$

In equation 7, $q(g_1', g_2|x_1)$ denotes a distribution modeling the joint occurrence of Gaussians of stream 1 and stream 2 and $t_1$ is an empirically determined threshold, in block 27.

In block 28, the number of Gaussians is reduced or limited. Equation 7 in essence uses the co-occurrence distribution $q(g_1', g_2|x_1)$ and set $Q_1$ to limit the number of Gaussians of stream 2 that are evaluated. For example, let $$Q_2 = \{g_2 : \max_{g'_1 \in Q_1} q(g'_1, g_2|x_1) > t_1\} \quad (8)$$

denote the set of Gaussians that are evaluated for stream 2. Controlling the size of $Q_2$ is one important way of how to derive primary computational savings. Note that distribution q is employed to determine $Q_1$; it is to be understood that other ways of determining $Q_1$ may be employed, for example, using of the probability values from this distribution.

Combining equations 5 and 7, and using the maximum approximation to summation, as was done in equation 2, the following results $$p(x_1, x_2|s) = \begin{cases} \max_{g_1 \in Y_1 \cap G_1(s)} p(g_1|s)p(x_1|g_1) \\ \max_{g_2 \in Y_2 \cap G_2(s)} p(g_2|s)p(x_2|g_2) \end{cases}, \quad (9)$$

From equation 8, the distribution $q(g_1', g_2|x_1)$ plays a central role in the amount of computational savings that can be derived from this method. This distribution can be modeled as $$q(g_1, g_2|x_1) = P_{Q_1}(g_1|x_1)q(g_2|g_1) \quad (10)$$

where $P_{Q_1}(g_1|x_1)q(g_2|g_1)$ is computed at test time from the likelihoods $p(x_1, g_1)$ given by hierarchical labeling of stream 1, as $$P_{Q_1}(g_1|x_1) = \frac{p(x_1, g_1)}{\sum_{g'_1 \in Q_1} p(x_1, g'_1)}. \quad (11)$$

The conditional distribution $q(g_2|g_1)$ is computed at training time by "counting" the instances where $g_1$ occurs in stream 1 together with $g_2$ in stream 2. Specifically, it is derived from the empirical expectation $$q(g_1, g_2) = \frac{1}{|T|} \sum_t p(g_1|x_1(t))p(g_2|x_2(t)), \quad (12)$$

where |T| is the total number of training feature vectors.

Figure 3:
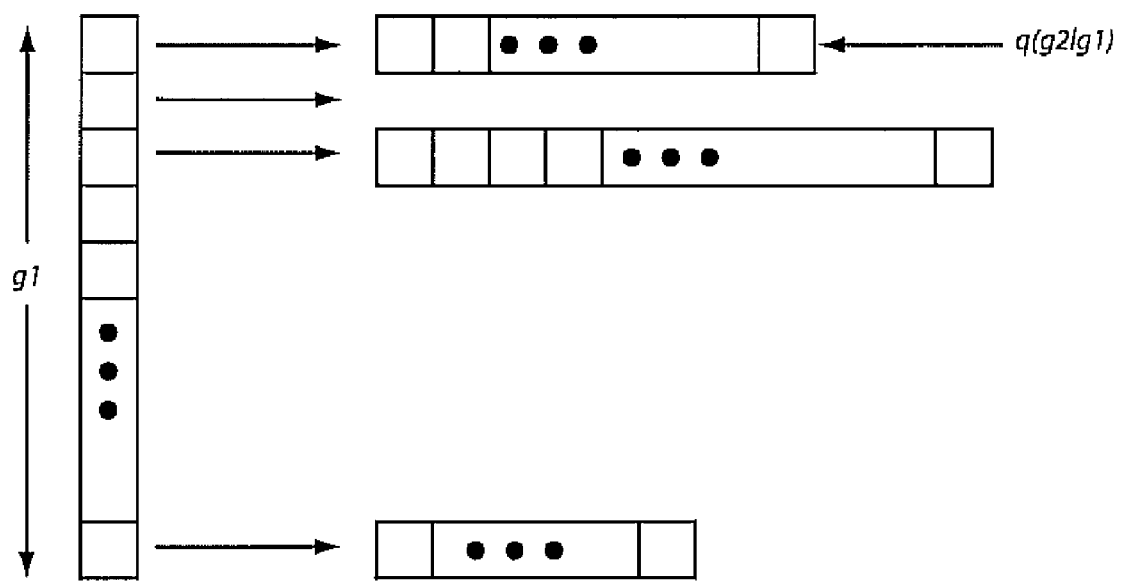
FIG. 3 is a diagram showing a Gaussian co-occurrence map in training in accordance with illustrative embodiments.

For storage efficiency, in block 30, $q(g_2|g_1)$ may be sorted in descending order and store only a top few $g_2$ Gaussians for each $g_1$ and include a cutoff to remove extra Gaussians (e.g., rank cutoff in FIG. 3). This stored map is referred to as the Gaussian co-occurrence map.

Referring to FIG. 3, a graphical rendering of a Gaussian co-occurrence map is illustratively shown. Gaussians in stream 1 ($g_1$) are identified which co-occur with Gaussians in stream 2 ($g_2$) to provide a co-occurrence map, $q(g_2|g_1)$.

Figure 4:
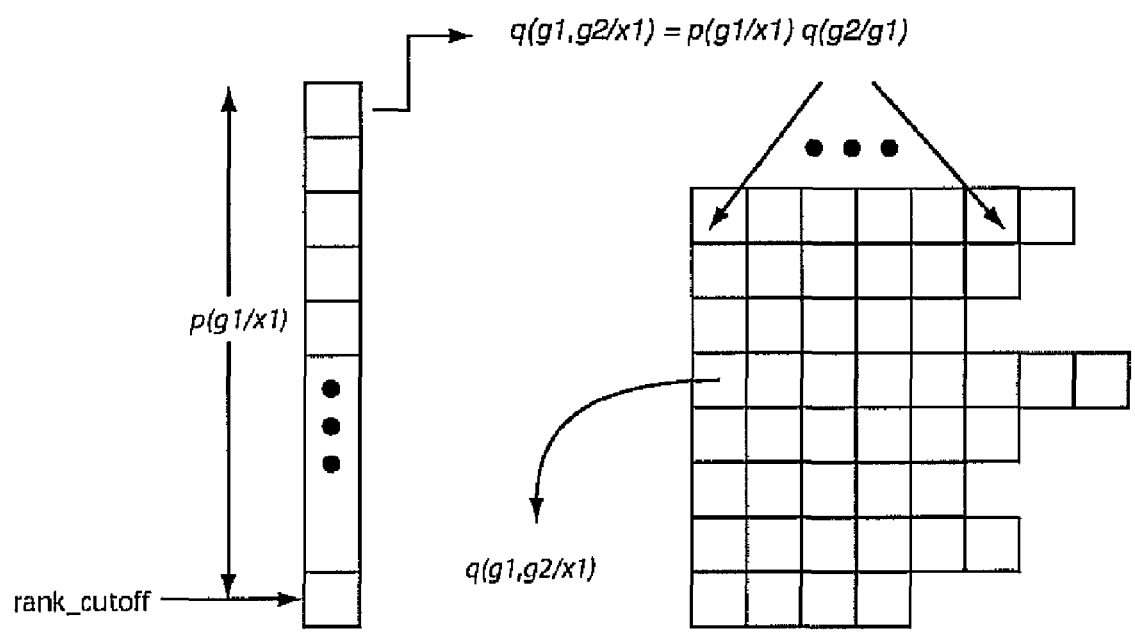
FIG. 4 is a diagram showing a Gaussian co-occurrence map at runtime in accordance with illustrative embodiments.

At test time, the Gaussian co-occurrence map is used in conjunction with $P_{Q_1}(g_1|x_1)$ values, computed according to equation 11. FIG. 4 shows the use of the co-occurrence map at runtime generating the co-occurrence distribution of equation 10.

Figure 5:
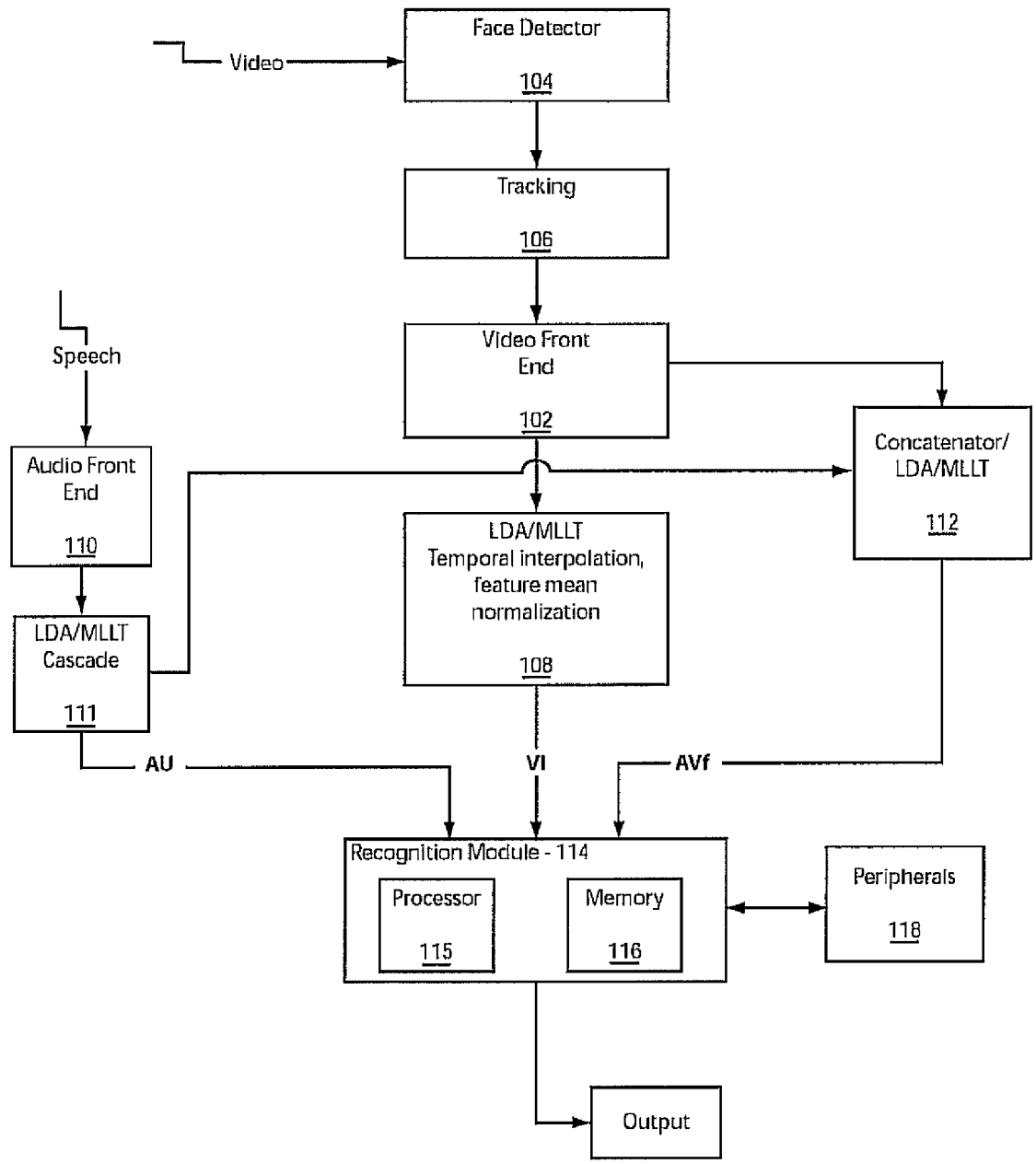
FIG. 5 is a block/flow diagram showing a speech recognition system which employs multiple streams for speech recognition in accordance with illustrative embodiments.

Referring to FIG. 5, a multi-stream audio-visual speech recognition system 100 is shown in accordance with one illustrative embodiment of the present invention. A multi-stream configuration may include three or more streams, e.g., an audio stream (AU), a visual stream (VI), and an audiovisual fused stream (AVf), implemented using, e.g., the HILDA approach.

A visual/video front-end 102 in the audio-visual speech recognition system 100 extracts appearance-based features within a region of interest (ROI) defined on, e.g., the mouth area of the speaker.

Given the video input, the system 100 first performs face detection using a face detector module 104 at frame-level, using e.g., multi-scale template matching based on a distance measure composed of the two-class (face/non-face) Fisher linear discriminant and the error incurred by projecting the candidate vector to a lower dimensional "face space" obtained through principal component analysis (PCA). Following face detection, 26 key facial points (e.g., eye corners and mouth corners) are tracked using a tracking module 106, which may employ algorithms, e.g., algorithms reported in Senior, A. W., "Face and feature finding for face recognition system," in *Proc. Int. Conf. Audio Visual-based Biometric Person Authentication*, pp. 154-159, 1999. The tracking results provide the location, size, and orientation estimates of the mouth. These parameters are subsequently smoothed over time and used to determine a 64×64-pixel ROI.

The visual features are preferably computed by applying a two-dimensional separable discrete cosine transform (DCT) to the sub-image defined by the ROI, and retaining the top 100 coefficients with respect to energy. The resulting vectors then go though a pipeline including of intra-frame LDA/MLLT (Linear Discriminant Analysis/Maximum Likelihood Linear Transformation), temporal interpolation, and feature mean normalization in module 108, producing, e.g., a 30-dimensional feature stream at 100 Hz. To account for inter-frame dynamics, fifteen consecutive frames in the stream are joined and subject to another LDA/MLLT step to give the final visual feature vectors (VI stream) with 41 dimensions.

The basic audio features extracted by an audio front-end 110 are preferably 24-dimensional Mel-frequency cepstral coefficients. After cepstral mean normalization, nine consecutive frames are concatenated and projected onto a 60-dimensional space through an LDA/MLLT cascade 111, generating the AU feature stream.

The AVf features are generated by concatenating, in block 112, the 60-dimensional AU and the 41-dimensional VI features and projecting this 101-dimensional feature to a 60-dimensional sub-space through LDA/MLLT.

A recognition system 114 uses three-state, left-to-right phonetic HMMs with context-dependent states. The instances of the sub-phonetic states are identified by growing a decision tree that clusters left and right contexts spanning up to five phones on each side. The states are specified by the terminal nodes of the tree, and the corresponding observation streams are modeled by mixtures of Gaussian densities with diagonal covariance matrices. System 114 includes one or more processors 115, memory 116 and peripherals 118 as needed.

Experimental Setup

The audio-visual speech recognition system is evaluated on a connected-digit recognition task using the IBM studio-DIGIT audio-visual database. The corpus includes Hill-face frontal video of 50 subjects, uttering 7 and 10-digit strings. A total of 6.7K utterances were recorded in a studio environment with uniform background and lighting. The acoustic signal to noise ratio (SNR) of the recorded data is measured at 19.5 dB.

The dataset is partitioned into three subsets: a training set including 5.4K utterances, a test set with 623 utterances, and a held-out set including 663 utterances. To evaluate the recognition performance in noisy environments, two noisy acoustic conditions were simulated by adding random segments of speech babble recordings to the clean speech samples. The average SNR of all three test conditions are 19.5 dB (original), as well as, 11.5 dB and 8.5 dB (noisy). The HMMs are trained using the clean data, based on a context tree with 159 leaves modeled by 3.2K Gaussian densities.

Experimental Results

The baseline recognition accuracy of the three individual streams is shown as a function of SNR in the top three rows of table 1. The fourth and fifth rows of this table show results of the traditional independent multi-stream configurations for AU+VI and AVf+VI pairs.

TABLE 1

Word error rates for single and multi-stream independent, and co-occurrence systems.

| SNR | 19.5 dB | 11.5 dB | 8.5 dB |
| --- | --- | --- | --- |
| AU | 1.60 | 13.45 | 25.78 |
| AVf | 1.65 | 9.38 | 15.98 |
| VI | 37.13 | 37.13 | 37.13 |
| AVf + VI(Ind.) | 1.59 | 7.85 | 12.12 |
| AU + VI(Ind.) | 1.61 | 6.97 | 14.10 |
| AVf + VI(Co.) | 1.61 | 7.62 | 12.06 |
| AU + VI(Co.) | 1.46 | 9.57 | 16.03 |

To carry out the co-occurrence experiments, we generated two maps: one with AU stream 1 and VI as stream 2, and the other with AVf as stream 1 and VI as stream 2. These maps were generated from all of 5.4K training sentences. During run time, hierarchical labeling of stream 1 was first carried out to generate the set $Y_1$. The set $Q_1$ was then derived from $Y_1$ by keeping only the Gaussians which attained the max score in equation 2. $Q_1$, in conjunction with the training time co-occurrence maps (FIG. 3) is then used to identify the stream 2 Gaussians that are to be evaluated in the runtime co-occurrence maps (FIG. 4, equation 8).

Figure 6:
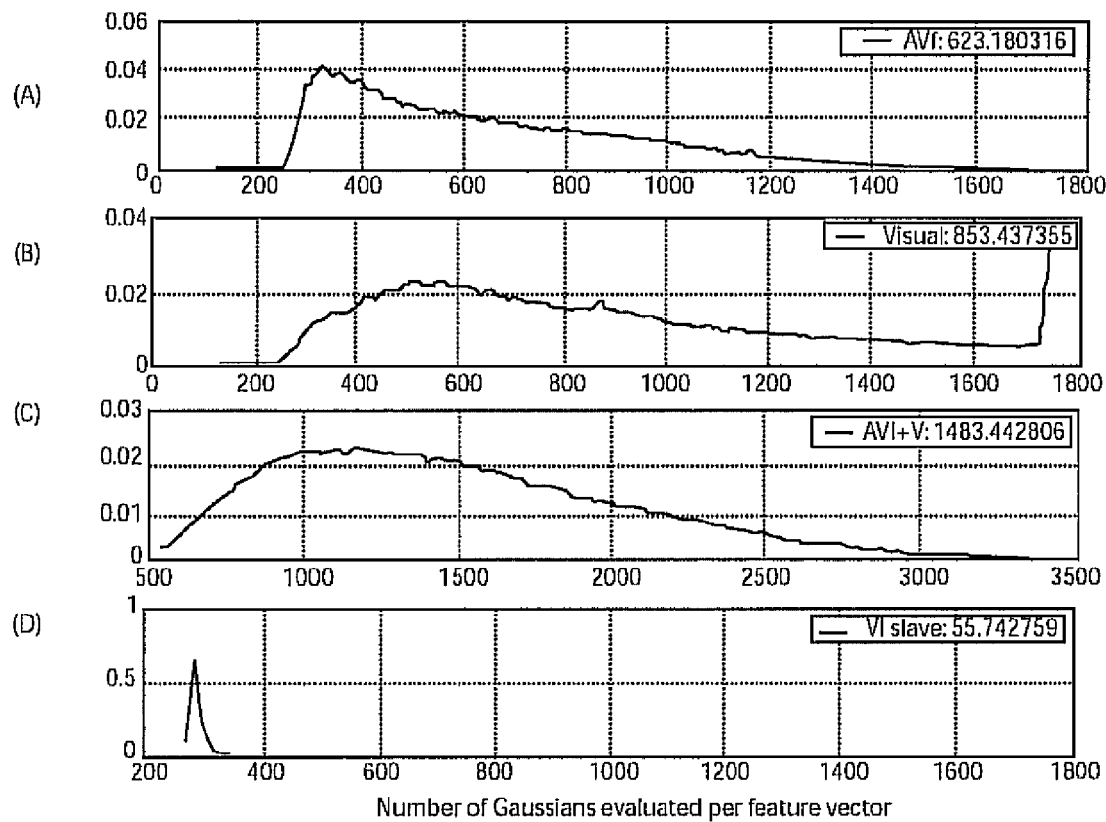
FIG. 6 are plots of Gaussian usage (SNR=8.5 dB) for (A) an audio-visual fused stream, (B) a visual stream, (C) a combined usage for audio-visual fused (AVf) and visual streams operating independently, and (D) an AVf and visual stream under a co-occurrence framework for audio.

Referring to FIG. 6, a normalized histogram of the number of Gaussians evaluated per feature vector of the AVf stream in panel (A) and for the VI stream in panel (B) are shown. Note that the sharp rise of the histogram at the trailing edge of (B) is due to absolute cutoffs on number of Gaussians that are permitted to be evaluated in a hierarchical labeler (see e.g., Novak et al., "Efficient hierarchical labeler algorithm for Gaussian likelihoods computation in resource constrained speech recognition systems,", ICASS 2002, http://www.research.ibm.com/people/r/rameshg/novak-icassp2002.ps.

Panel (C) shows the histogram of the Gaussian usage for the case of independent combination of AVf and VI. The legend numbers in the plots indicate the mean usage per observation vector.

Note that in addition to measuring the computational load, these histograms also serve as an indicator of the Gaussian separability in different streams. For instance, a sharper distribution in panel (A) as compared to that in panel (B) indicates that the AVf stream has a better discrimination between Gaussians than the VI stream. This is in fact corroborated by the significantly lower error rate obtained with the AVf system as shown in Table 1.

Panel (D) of FIG. 6 shows the Gaussian usage for the VI stream operating under the co-occurrence framework with AVf as stream 1. The drastic reduction in Gaussian usage is evident. Details of the impact on Gaussian usage for the AVf and VI streams operating independently and with co-occurrence as a function of decreasing SNR is shown in Table 2.

TABLE 2

Average number of evaluated Gaussians per frame for the VI stream determined independently or as a slave of the AVf stream, compared with that of the AVf stream.

| SNR | 19.5 dB | 11.5 dB | 8.5 dB | Average |
|---|---|---|---|---|
| AVf | 423 | 584 | 623 | 543 |
| VI Ind. | 853 | 853 | 853 | 853 |
| VI Co. | 30 | 48 | 56 | 45 |

On average, a 94.7% reduction in the number of Gaussians evaluated is obtained while maintaining the word error rate of the independent stream result, as seen by comparing AVf+VI (Ind.) and AVf+VI(Co.) rows of Table 1.

A novel system and method for significantly reducing the number of Gaussian likelihood calculations in a multi-stream system through co-occurrence is disclosed. On an audiovisual digit recognition task, it has been found that for certain stream pairs large reduction in the number of Gaussian evaluations can be achieved without any loss in accuracy.

Having described preferred embodiments of a system and method for likelihood computation in multi-stream hmm based audio-visual speech recognition (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for speech recognition, comprising the steps of:
   determining active Gaussians related to a first feature stream and a second feature stream by labeling at least one of the first and second streams;
   determining active Gaussians co-occurring in the first stream and the second stream based upon joint probability;
   reducing a number of Gaussians computed for the second stream based upon Gaussians already computed for the first stream and a number of Gaussians co-occurring in the second stream; and
   using a computer, decoding speech based on the Gaussians computed for the first and second streams.

2. The method as recited in claim 1, wherein the step of labeling includes hierarchically labeling by surveying Gaussians in multiple resolutions.

3. The method as recited in claim 1, wherein the step of labeling includes employing a search tree.

4. The method as recited in claim 1, wherein the step of determining a distribution of Gaussians co-occurring includes providing a Gaussian co-occurrence map.

5. The method as recited in claim 1, wherein the first stream includes an audio stream and the second stream includes a video stream and the step of decoding speech includes employing multi-stream hidden Markov models.

6. The method as recited in claim 1, further comprising a plurality of feature streams wherein the step of decoding speech includes employing multi-stream hidden Markov models.

7. The method as recited in claim 1, further comprising a plurality of feature streams wherein the step of decoding speech includes employing multi-stream hidden Markov models.

8. A method for speech recognition based upon a plurality of feature streams, comprising the steps of:
   determining active Gaussians related to a first feature stream by hierarchically labeling the first feature stream;
   determining active Gaussians co-occurring in the feature streams other than the first feature stream based upon joint probability using co-occurrence statistics such that a number of Gaussians computed for subsequent feature streams are reduced based upon co-occurring Gaussians already computed for at least one other feature stream; and
   using a computer, decoding speech based on the Gaussians computed for the plurality of feature streams.

9. The method as recited in claim 8, wherein the step of hierarchically labeling includes surveying Gaussians in multiple resolutions.

10. The method as recited in claim 8, wherein the step of hierarchically labeling includes employing a search tree.

11. The method as recited in claim 8, wherein the step of determining active Gaussians includes providing a Gaussian co-occurrence map.

12. The method as recited in claim 8, wherein the first feature stream includes an audio stream and at least one other stream includes a video stream and the step of decoding speech includes employing multi-stream hidden Markov models.

13. A non-transitory computer-readable program storage device encoded with a program of instructions that, when executed by at least one computer, performs a method for speech recognition comprising:
   determining active Gaussians related to a first feature stream and a second feature stream by labeling at least one of the first and second streams;
   determining active Gaussians co-occurring in the first stream and the second stream based upon joint probability;
   reducing a number of Gaussians computed for the second stream based upon Gaussians already computed for the first stream and a number of Gaussians co-occurring in the second stream; and
   decoding speech based on the Gaussians computed for the first and second streams.

14. A non-transitory computer-readable program storage device encoded with a program of instructions that, when executed by at least one computer, performs a method for speech recognition comprising:
   determining active Gaussians related to a first feature stream by hierarchically labeling the first feature stream;
   determining active Gaussians co-occurring in the feature streams other than the first feature stream based upon joint probability using co-occurrence statistics such that a number of Gaussians computed for subsequent feature streams are reduced based upon co-occurring Gaussians already computed for at least one other feature stream; and
   decoding speech based on the Gaussians computed for the plurality of feature streams.

15. A speech recognition system, comprising:

at least one memory to store processor-executable instructions; and at least one processor coupled to the at least one memory, wherein upon execution of the processor-executable instructions by the at least one processor, the at least one processor:

A) extracts features from a first stream to generate likelihoods of the features of the first stream;

B) extracts features from a second stream associated with the first stream for generating likelihoods of the features of the second stream;

C) determines active Gaussians used to compute the likelihoods of the features of the first stream and finds active Gaussians co-occurring in the second stream to generate the likelihoods of the features of the second stream such that a number of Gaussians computed for the second stream is reduced based upon Gaussians already computed for the first stream; and D) decodes speech based on the Gaussians computed for the first and second streams.

16. The speech recognition system as recited in claim 15, wherein the at least one processor further fuses the features associated with the first and second streams to provide a third stream for decoding speech.

17. The speech recognition system as recited in claim 15, wherein in D) the at least one processor employs multi-stream hidden Markov models.

18. The speech recognition system as recited in claim 15, wherein in D) the at least one processor employs a co-occurrence map to generate joint probability statistics for the likelihoods associated with the first and second streams.

19. The speech recognition system as recited in claim 15, wherein the first stream includes an acoustic stream and the second stream includes a video stream.

20. The speech recognition system as recited in claim 19, wherein the video stream includes a human image as a region of interest for decoding speech.

21. The speech recognition system as recited in claim 15, wherein in D) the at least one processor decodes speech in accordance with a plurality of streams.

22. The speech recognition system as recited in claim 15, wherein the at least one processor further determines a set of available Gaussians for at least one stream.

* * * * *

UNITED STATES PATENT AND TRADEMARK OFFICE
CERTIFICATE OF CORRECTION

PATENT NO.         : 8,121,840 B2
APPLICATION NO.    : 12/131190
DATED              : February 21, 2012
INVENTOR(S)        : Stephen Mingyu Chu et al.

Page 1 of 1

It is certified that error appears in the above-identified patent and that said Letters Patent is hereby corrected as shown below:

Col. 11, in line 4 of claim 15, please change the "." after the word "memory" to a --,--.

Signed and Sealed this
Twenty-fourth Day of April, 2012

David J. Kappos
*Director of the United States Patent and Trademark Office*